Dec. 15, 1925.

E. M. BOUTON 1,565,412

MOTOR CONTROL SYSTEM

Filed May 24, 1923

WITNESSES:

INVENTOR
Edgar M. Bouton.
BY
ATTORNEY

Patented Dec. 15, 1925.

1,565,412

UNITED STATES PATENT OFFICE.

EDGAR M. BOUTON, OF EAST PITTSBURGH, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed May 24, 1923. Serial No. 641,046.

*To all whom it may concern:*

Be it known that I, EDGAR M. BOUTON, a citizen of the United States, and a resident of East Pittsburgh, in the county of Allegheny and State of Pennsylvania, have invented a new and useful Improvement in Motor-Control Systems, of which the following is a specification.

My invention relates to systems of motor control and it has particular relation to such systems as are employed in connection with elevators, planers and similar machines.

The object of my invention is to provide a variable voltage control with particular relation to means for insuring positive stopping of the motor.

Other objects of my invention will appear from the following description and the claims appended thereto.

In accordance with my invention, I employ a motor, preferably having a separately excited shunt field-magnet winding, and a compound-wound generator for controlling the motor. The motor speed is controlled in accordance with the field excitation of the generator, and I provide an extra field-magnet winding for the generator, together with means for automatically connecting this field-winding in circuit with the generator armature to positively de-magnetize the generator field-magnet structure and thus guard against creeping of the motor armature when the system is inoperative.

Figure 1:
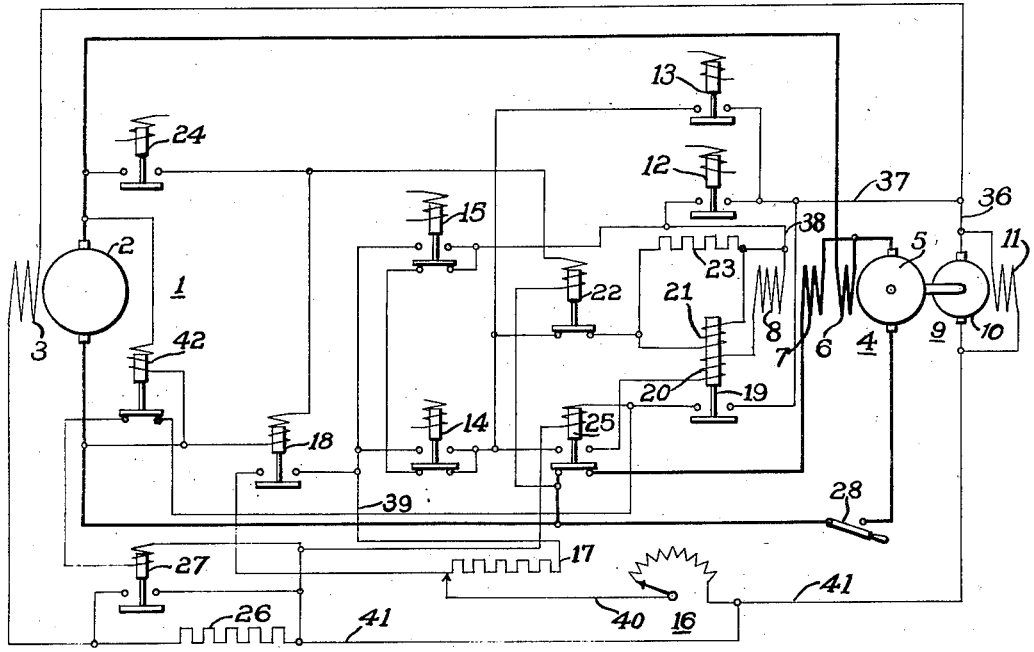
Figure 2:
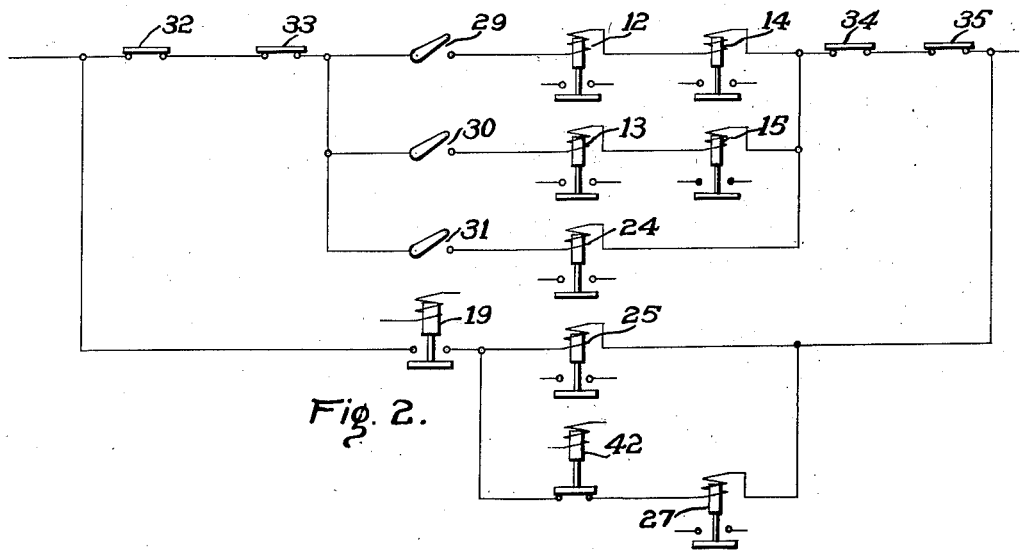

My invention will be best understood by reference to the accompanying drawing in which, Figure 1 is a diagrammatic view of circuits and apparatus embodying my invention, and Fig. 2 is a diagrammatic view of certain of the control circuits of the system shown in Fig. 1.

With reference to the drawing, a motor 1, having an armature 2 and a field magnet winding 3, is arranged for connection in a loop or closed circuit with a generator 4 having an armature 5, a cumulative series field-magnet winding 6, an extra field-magnet winding 7 of the series type and a main shunt field-magnet winding 8 that is preferably energized from an exciter 9 having an armature 10 and a shunt field-magnet winding 11. The main shunt field-winding 8 may be controlled, in a familiar manner, by means of reversing switches 12, 13, 14 and 15. A field rheostat 16 is provided for connection in circuit with the field winding 8 and with an auxiliary resistor 17. A relay 18 is connected to control resistor 17, and a relay 19 is provided with one operating coil 20 in circuit with field winding 8. A second operating coil 21 is arranged, as about to be described, for controlling relay 19. A relay 22 controls a resistor 23 that is connected in a circuit in shunt relation to the field winding 8, the operating coil 21 being connected across resistor 23. A relay 24 is provided for controlling relays 18 and 22, as hereinafter set forth. A switch 25 controls circuits through field-windings 7 and 8 of generator 4. A resistor 26 and a relay 27 therefor are provided for controlling the excitation of motor field-winding 3. A main switch 28 completes the loop circuit comprising motor armature 2 and generator armature 5.

Referring to Fig. 2, in which the reference numerals indicate certain of the apparatus so designated in Fig. 1, manually operable switches 29 and 30 are provided for controlling the generator-field-reversing switches 12, 13, 14 and 15. A manually-operable switch 31 controls relay 24. A plurality of safety switches 32, 33, 34 and 35 are arranged in the control circuit as illustrated and are manually operated, or otherwise controlled, as is well understood in elevator practice.

Assuming the apparatus to be in its inoperative condition, as illustrated, switch 28 is first closed to complete the main or loop circuit comprising armatures 2 and 5. The switch 28 preferably remains closed during all normal operations. It may be assumed that generator amature 5 is driven at a constant speed, in a customary manner, whereby the exciter 9 provides a current supply suitable for operating the magnetic switches in a manner to be described. The motor 1 is started in a forward direction by closing switch 29, whereupon field-reversing switches 12 and 14 close. A circuit now extends from the exciter 9 through conductors 36 and 37, switch 12, conductor 38, coil 21, relay 22, switch 14, conductor 39, resistor 17, conductor 40 and rheostat 16 to conductor 41 and exciter 9. Relay 19 now closes and effects the closure of relay 25, (Fig. 2) thereby completing a circuit for field-magnet winding 8 which now becomes energized by exciter 9, a circuit therefor extending from conductor 36, through conductor 37, switch 12, field winding 8, coil 20, relay 25, switch 14, conductor 39, resistor 17, conductor 40 and rheostat 16 to conductor 41. Relay 27 is also closed by the closure of relay 19, thereby fully energizing motor field winding 3.

The motor 1 now starts with full field excitation and is accelerated by the manipulation of generator field-rheostat 16, which is now operated in a clock-wise direction. To further increase the motor speed, switch 31 is closed to operate relay 24. When the voltage of generator armature 5 reaches a desired value, relay 22 opens and interrupts a circuit through resistor 23, which is in shunt relation to generator field winding 8. It will be noted that the operating coil of relay 22 is connected, through relay 24 and switch 28, to generator armature 5. When the generator voltage further increases upon disconnecting resistor 23, as above mentioned, relay 18 closes to shut resistor 17, relay 18 also being subject to the voltage of generator armature 5. The shunting of resistor 17 further strengthens the field of generator 4 to further increase the speed of motor 1, and the motor field winding 3 is automatically weakened by the opening of relay 27, which is effected in accordance with the voltage of generator armature 5, relay 27 being controlled by a voltage relay 42.

The motor 1 is decelerated by first opening switch 31, whereupon relay 24 opens to open relay 18 and close relay 22. Resistors 17 and 23 are thus re-connected in series and in shunt relation, respectively, to generator field winding 8. Field rheostat 16 is now operated, in a counter-clockwise direction, to its initial position and, at a certain low voltage, relay 42 closes to effect the closure of relay 27 to thereby strengthen the excitation of motor field winding 3. Reversing switches 12 and 14 are opened by means of switch 29 to de-energize field winding 8. Relay 19 is maintained in its closed position until the current in field winding 8 is substantially reduced, whereupon relay 19 is released to restore switch 25 to its lower illustrated position, thereby connecting extra field winding 7 in circuit with generator armature 5. The field winding 7 is differentially wound with respect to the series field winding 6 and is designed to thereby effect a complete demagnetization of the field-magnet structure of generator 4 and insure a positive stopping of the motor 1. It may be noted that, since the series winding 7 is of low ohmic value and is connected in circuit with motor armature 2, it has a dynamic-braking effect upon the motor armature. Additional dynamic-braking effect for the motor armature 2 is occasioned by the fact that when the field-magnet structure of generator 4 is totally demagnetized, the generator armature 5 also acts in a dynamic-braking capacity.

The acceleration and deceleration of the motor 1 is likewise effected in the opposite direction of rotation by means of field-reversing switches 13 and 15 as will, of course, be readily understood, the other circuit connections and operations being as hereinbefore described.

From the foregoing description of my invention, it will be apparent that, in addition to the automatic speed control afforded by means of relays controlled in accordance with the varying-voltage conditions of the circuit, positive stopping of the motor is insured. Unless means is provided for completely demagnetizing the generator field-magnet structure, it has been discovered that sufficient current will circulate through the motor and generator armatures to cause the motor armatures to "creep." Such a condition is very undesirable and it is one of the objects of my invention to prevent such an occurrence.

I claim as my invention:

1. The combination with a motor and a separately excited generator for supplying current to the motor, of an extra field-magnet winding for the generator, and means for connecting said extra field winding in circuit with said generator under predetermined voltage conditions when stopping the motor.

2. The combination with a motor and a separately excited generator for supplying current to the motor, of an extra field-magnet winding for the generator, and means for connecting said extra field winding in circuit with said generator under predetermined voltage conditions to demagnetize the field-magnet structure of said generator when stopping the motor.

3. The combination with a motor and a separately excited generator for supplying current to the motor, of an extra field-magnet winding for the generator, and means for connecting said extra field winding in circuit with said generator to demagnetize the field-magnet structure of said generator under predetermined voltage conditions and effect dynamic braking of said motor.

4. The combination with a motor and a separately excited generator for supplying current to the motor of means for varying the field excitation of the generator to control the motor speed, an extra field winding for said generator, and means controlled in accordance with the field excitation of said generator for connecting said extra field winding in circuit to control said motor.

5. The combination with a motor and a separately excited generator for supplying current to the motor, of means for varying the field excitation of the generator to control the motor speed, an extra field winding for said generator, and means controlled in accordance with the field excitation of said generator for controlling said extra field winding to effect positive stopping of said motor.

6. The combination with a motor and a separately excited generator for supplying current to the motor, of means for varying the field excitation of the generator to control the motor speed, an extra field winding for said generator and means comprising a relay having a coil controlled in accordance with the field excitation of said generator for connecting said extra field winding in circuit to control said motor.

7. The combination with a motor and a separately excited generator for supplying current to the motor, of means for varying the field excitation of the generator to control the motor speed, an extra field winding for said generator, and means comprising a relay having a coil controlled in accordance with the field excitation of said generator for controlling said extra field winding to effect positive stopping of said motor.

8. The combination with a separately excited motor and a generator, having a shunt and a series wound field magnet, for supplying current to the armature of said motor, of means for controlling the excitation of the generator, an extra field-magnet winding for said generator, and means comprising a coil in circuit with said generator shunt winding for preventing excitation of said extra winding prior to a predetermined slow-down of said motor.

9. The combination with a separately excited motor and a generator, having a shunt and series wound field-magnet, for supplying current to the armature of said motor, of means for controlling the excitation of the generator shunt field winding, an extra series generator field-winding for connection in circuit with the generator armature for demagnetizing the generator field-magnet structure to insure stopping the motor, and means comprising a coil in circuit with said shunt field winding for maintaining said extra field-winding disconnected from said circuit when the excitation of said shunt winding is above a predetermined value.

10. The combination with a separately excited motor and a generator, having a shunt and a series wound field-magnet, for supplying current to the armature of said motor, of means for both manually and automatically controlling the excitation of the generator shunt field winding, an extra series generator field-winding for connection in circuit with the generator armature for demagnetizing the generator field-magnet structure to insure stopping the motor, and means comprising a coil in circuit with said shunt field winding for maintaining said extra field-winding disconnected from said circuit when the excitation of said shunt winding is above a predetermined value.

In testimony whereof, I have hereunto subscribed my name this 14th day of May, 1923.

EDGAR M. BOUTON.